US009705412B2

(12) United States Patent
Adragna

(10) Patent No.: US 9,705,412 B2
(45) Date of Patent: Jul. 11, 2017

(54) PULSED FEEDBACK SWITCHING CONVERTER

(71) Applicant: STMICROELECTRONICS S.R.L., Agrate Brianza (IT)

(72) Inventor: Claudio Adragna, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 58 days.

(21) Appl. No.: 14/632,774

(22) Filed: Feb. 26, 2015

(65) Prior Publication Data

US 2016/0252918 A1 Sep. 1, 2016

(51) Int. Cl.
*H02M 3/335* (2006.01)
*H02M 3/156* (2006.01)
*G05F 1/56* (2006.01)

(52) U.S. Cl.
CPC ....... *H02M 3/33569* (2013.01); *H02M 3/156* (2013.01); *G05F 1/56* (2013.01)

(58) Field of Classification Search
CPC ............................................ H02M 2001/0012
See application file for complete search history.

(56) References Cited

U.S. PATENT DOCUMENTS 5,367,247 A 11/1994 Blocher et al.
5,852,550 A * 12/1998 Majid ............... H02M 3/33523
363/19
6,100,827 A * 8/2000 Boesch .................... H03C 3/40
341/118
6,191,565 B1 2/2001 Lee et al.
6,259,614 B1 7/2001 Ribarich et al.
6,307,361 B1 10/2001 Yaakov et al.
6,842,353 B2 1/2005 Yamada et al.
7,307,405 B2 12/2007 Adragna et al.
RE40,016 E 1/2008 Ribarich et al.
7,345,464 B2 3/2008 Steele
8,467,209 B2 6/2013 Adragna
(Continued)

FOREIGN PATENT DOCUMENTS

EP 1387476 A1 2/2004

OTHER PUBLICATIONS

Adragna, C., "Control Loop Modeling of L6561-Based TM PFC," Application Note AN 1089, STMicroelectronics, Mar. 2000, 12 pages.
(Continued)

*Primary Examiner* — Fred E Finch, III
*Assistant Examiner* — Yusef Ahmed
(74) *Attorney, Agent, or Firm* — Seed IP Law Group LLP

(57) ABSTRACT

The present disclosure is directed to a switching power converter having a regulated output voltage or output current. The power converter uses a control unit having a signal conditioning circuit to produce a control voltage signal, which is used to drive a power stage of the converter. The signal conditioning circuit includes a comparator that compares a measured electrical quantity to a reference value representative of a desired regulated output quantity, and produces a digital detection signal based on the comparison. A control actuator uses the digital detection signal to produce a correction signal, which is received by an averaging circuit. The averaging circuit then produces the control voltage signal based on an average of the correction signal.

20 Claims, 13 Drawing Sheets

(56) References Cited

U.S. PATENT DOCUMENTS

| | | | | |
|---|---|---|---|---|
| 2003/0231011 A1* | 12/2003 | Umemoto | H02M 1/38 | 323/284 |
| 2004/0046683 A1* | 3/2004 | Mitamura | H02M 3/157 | 341/144 |
| 2004/0095101 A1 | 5/2004 | Pidutti et al. | | |
| 2004/0263140 A1 | 12/2004 | Adragna et al. | | |
| 2006/0013026 A1 | 1/2006 | Frank et al. | | |
| 2006/0208789 A1 | 9/2006 | Shimada | | |
| 2007/0070663 A1* | 3/2007 | Adragna | H02M 1/32 | 363/89 |
| 2008/0203997 A1* | 8/2008 | Foran | H02M 3/1588 | 324/76.11 |
| 2008/0246444 A1 | 10/2008 | Shao et al. | | |
| 2009/0243580 A1* | 10/2009 | Chen | H02M 3/156 | 323/288 |
| 2009/0299592 A1* | 12/2009 | Oehler | B60T 8/36 | 701/70 |
| 2010/0110593 A1 | 5/2010 | Kim et al. | | |
| 2010/0315838 A1 | 12/2010 | Mao et al. | | |
| 2011/0068761 A1* | 3/2011 | Chen | H02M 3/156 | 323/282 |
| 2011/0204866 A1* | 8/2011 | Moon | H02M 3/33523 | 323/284 |
| 2011/0273433 A1* | 11/2011 | Ahn | G09G 3/3696 | 345/213 |
| 2012/0019219 A1* | 1/2012 | Fang | H02M 3/156 | 323/271 |
| 2012/0026765 A1* | 2/2012 | Adragna | H02M 1/4225 | 363/78 |
| 2012/0119719 A1* | 5/2012 | Teh | H02M 3/1588 | 323/282 |
| 2012/0194162 A1* | 8/2012 | Lin | H02M 1/14 | 323/304 |
| 2012/0262082 A1 | 10/2012 | Esaki et al. | | |
| 2012/0286756 A1* | 11/2012 | Tsukiji | H02M 3/158 | 323/284 |
| 2013/0077350 A1* | 3/2013 | Mao | H02M 3/33523 | 363/16 |
| 2013/0113450 A1* | 5/2013 | Tang | G05F 1/10 | 323/283 |
| 2014/0016373 A1* | 1/2014 | Zhang | H02M 3/33523 | 363/21.15 |
| 2014/0176102 A1* | 6/2014 | Tang | G05F 1/10 | 323/283 |
| 2014/0210444 A1* | 7/2014 | Nakamura | H02M 3/156 | 323/283 |
| 2014/0347895 A1* | 11/2014 | Tadamasa | H02M 3/33507 | 363/21.16 |
| 2014/0362621 A1* | 12/2014 | Huang | H02M 3/33507 | 363/50 |
| 2015/0214845 A1* | 7/2015 | Kawashima | H02M 3/33523 | 363/21.18 |
| 2015/0326102 A1* | 11/2015 | Radhakrishnan | H02M 1/00 | 323/271 |
| 2016/0111961 A1* | 4/2016 | Balakrishnan | H02M 3/33507 | 363/21.12 |

OTHER PUBLICATIONS

Demetriades et al., "Characterisation of the soft-switched single-active bridge topology employing a novel control scheme for high-power dc-dc applications," IEEE 36$^{th}$ Power Electronic Specialists Conference (PESC), Racife, Brazil, Jun. 12-16, 2005, vols. 1-3, pp. 1947-1951.

Huber et al., "Effect of Valley Switching and Switching-Frequency Limitation on Line-Current Distortions of DCM/CCM Boundary Boost PFC Converters," *IEEE Transactions on Power Electronics* 24(2):339-347, Feb. 2009.

Kim et al., "Variable On-time Control of the Critical Conduction Mode Boost Power Factor Correction Converter to Improve Zero-crossing Distortion," International Conference on Power Electronics and Drives Systems (PEDS 2005), pp. 1542-1546, Nov. 2005.

Langeslag et al., "VLSI Design and Application of a High-Voltage-Compatible SoC-ASIC in Bipolar CMOC/DMOS Technology for AC-DC Rectifiers," *IEEE Transactions on Industrial Electronics* 54(5):2626-2641, Oct. 2007.

\* cited by examiner

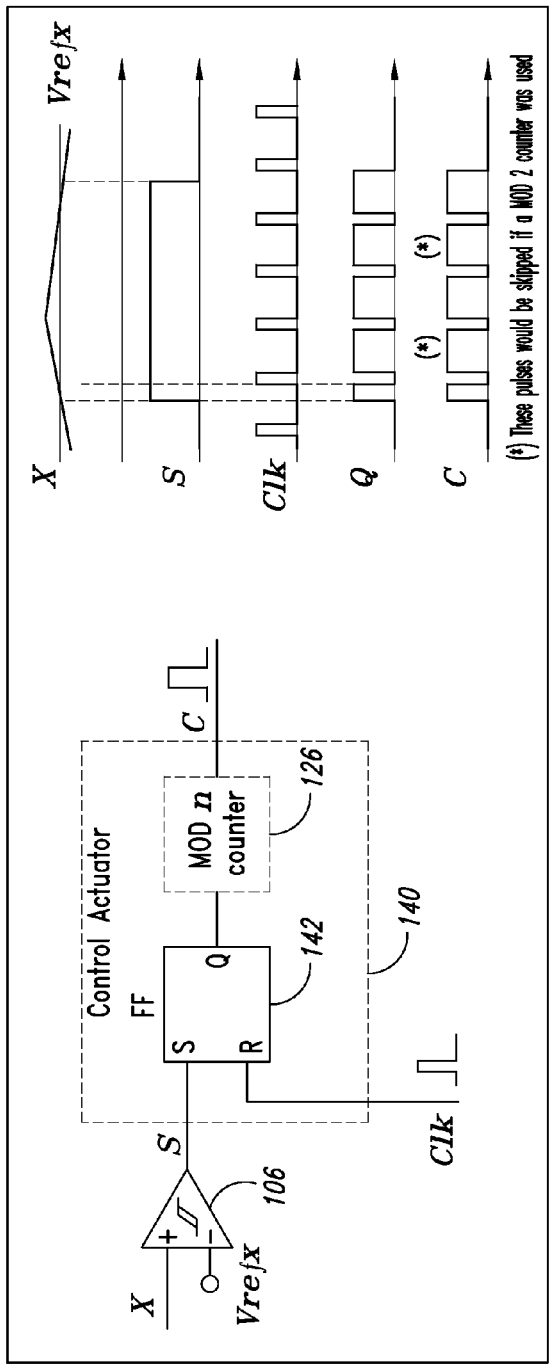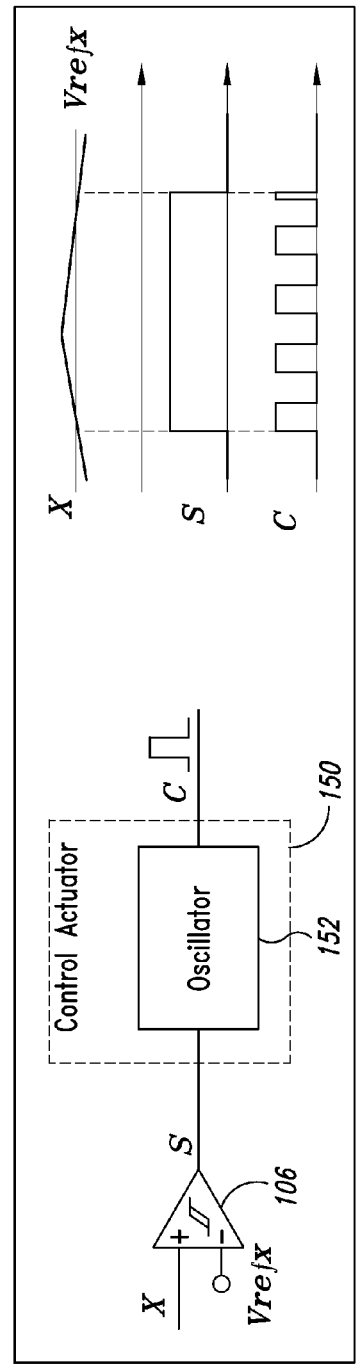
FIG. 8
FIG. 9

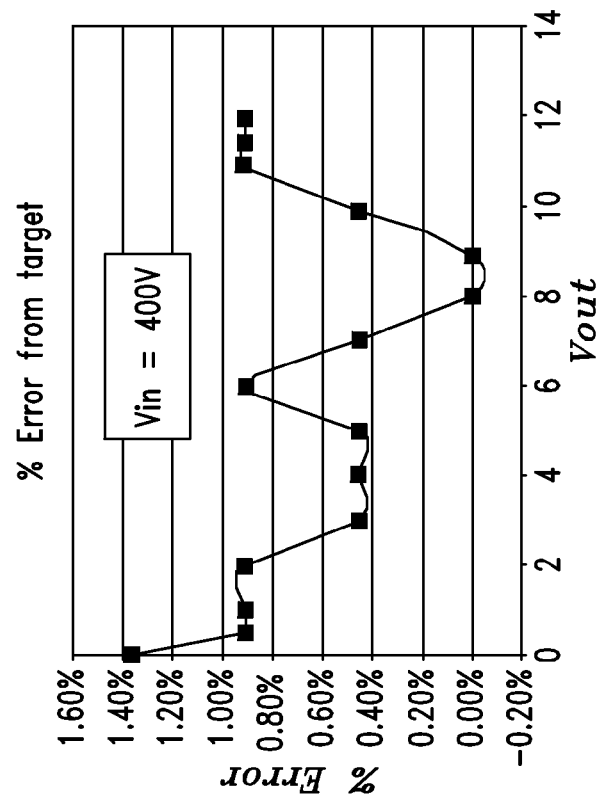
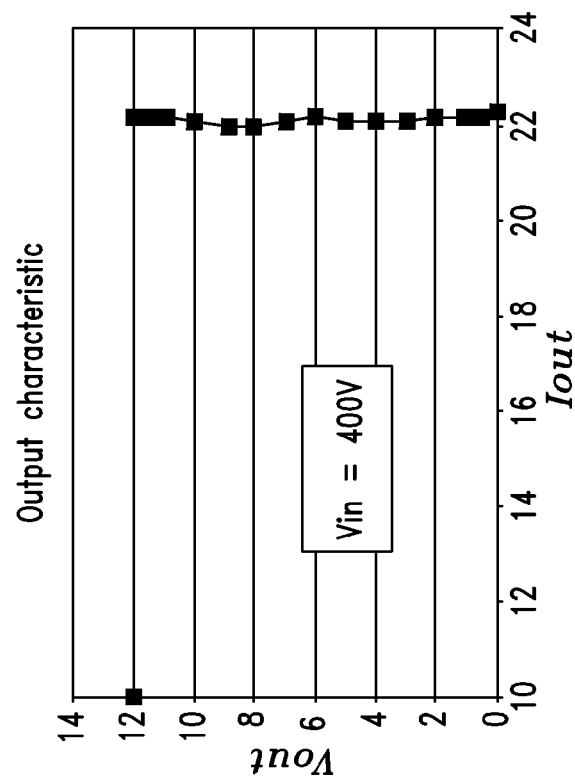
FIG. 17

PULSED FEEDBACK SWITCHING CONVERTER

BACKGROUND

Technical Field

The present disclosure is directed to power converters and, more particularly, switch-mode power converters having a regulated output voltage or output current.

Description of the Related Art

Power converters are very common devices for translating electrical energy from one form to another. The conversion of energy from one form to another can take place in a variety of different ways, such as ac-dc, dc-dc, ac-ac and dc-ac power converters. Inherent to all power converters is control of the converter, generally through a control circuit.

The block diagram of FIG. 1 shows a general structure of a power converter 20, located between a power source 22 and a load 24. The power converter 20 includes a power stage 26, sometimes termed "power circuit," and a control unit 28, which is connected to the power stage 26 and controls the power stage operation based in part on measurements of the output voltage or current produced at the load 24. The power converter 20 receives power from the source 22 and converts the electrical energy to a different form to apply to the load 24.

The power stage 26 can be implemented by many power stages known in the art and generally includes a combination of power semiconductor devices and passive components, mainly transformers, inductors, and capacitors. In some converters, the power stage involves multiple conversion stages using the same or different topologies connected either in a cascade or in parallel.

The control unit 28 receives measured electrical quantities, which are representative of the output voltage Vout or output current Iout, in the power stage 26 through measurement systems 29. Based on the measured quantities received, the control unit 28 outputs control signals that enable the power stage 26 to modulate and control the energy flow, effectively regulating the electrical quantities.

Modern power conversion is usually based on switch-mode technology, where one or more switches are used to close or open branches in the power circuit 26 at a switching frequency, $f_{sw}$, to control energy flow. The switches are generally power semiconductor switches so the control quantities output by the control unit are two-level pulsed signals that determine the open and closed state of the controllable power switches. The power switches may be any suitable semiconductor device for handling high-power switching operations, such as bipolar junction transistors (BJTs), field effect transistors (FETs), and insulated gate bipolar transistors (IGBTs). The switches can also include diodes.

For dc-dc converters, the control unit 28 functions to keep the dc output voltage Vout or the dc output current Iout constant, even under changing operating conditions. Operating conditions may change as a result of changes in the dc input voltage Vin or changes in the output power demanded by the load 24. The control unit 28 ensures that the output quantity to be regulated (either Vout or Iout) is as close as possible to a preset constant value, also referred to as the setpoint.

FIG. 2 illustrates a control unit 28 having a common closed-loop, negative-feedback control design. The control unit 28 of FIG. 2 includes four major blocks: a sensing circuit 30, a signal conditioning circuit 32, a modulator 34 and a driver 36.

The sensing circuit 30 measures the quantity to be regulated, generally either the output voltage Vout or the output current Iout, and produces a measured value signal X representative of the quantity to be regulated, as well as other electrical quantities in the power circuit that are used to perform the control action. The measured value signals X are then transmitted to the signal conditioning circuit 32, while some additional electrical quantities are transmitted to the modulator 34.

The signal conditioning circuit 32 processes the measured value signal X coming from the sensing circuit 30. In particular, the signal conditioning circuit receives the measured value signal X, and generates either a control voltage $V_c$ or a control current $I_c$ based on the measured value signal X. As in most closed-loop, negative-feedback control systems, the signal conditioning circuit 32 includes a frequency-compensated error amplifier 38. The frequency-compensated error amplifier 38 is generally an operational amplifier surrounded by a passive network.

The modulator 34 combines the control signal (either $V_c$ or $I_c$) with additional signals produced by the sensing circuit 30 to modulate a quantity Ψ, which the power stage 26 ultimately uses for control of the energy flowing through the power stage. Ultimately, the modulator 34 generates a train of low-power two-level pulsed signals $q_j(t)$ which are received by the driver 36.

The driver 36 is generally a power amplifier and a level shifter which receives the low-power inputs $q_j(t)$ and produces the higher power signals $Q_j(t)$. The signals Qj(t) have an amplitude and a power level suitable to drive the power switches of the power stage 26.

When the operating conditions of the converter change, any deviation in the regulated quantity Vout or Iout from the setpoint produces a change in the control signal $V_c$ or $I_c$. This change in the control signal results in a change in the quantity Ψ, which balances the input-to-output energy flow. This balance ensures that the regulated quantity Vout or Iout remains as close as possible to the setpoint.

In order to achieve the control regulation of the output quantity Vout or Iout, the control system is designed to ensure a stable control loop, good regulation, and good dynamic performance. A stable control loop can be met by recovering the regulated quantity Vout or Iout to a steady-state value after disturbances of the operating conditions of the converter have finished. Good regulation is met when both the constant value of the regulated quantity Vout or Iout before the disturbance and the new constant value of the regulated quantity Vout or Iout following the disturbance are as close to the setpoint as possible. Finally, good dynamic performance is achieved when the regulated quantity Vout or Iout does not excessively deviate from the setpoint and the transient itself fades away in a short time.

These control objectives may be expressed in terms of characteristic quantities of the transfer function of the control loop, such as bandwidth, phase margin and dc gain. The objectives can be achieved by acting on the frequency response of the error amplifier network 38 in the signal conditioning circuit 32, such as modifying its gain and appropriately placing the poles and zeroes of its transfer function. This may be achieved by selection of the value of resistors and capacitors that make up the passive network attached to the amplifier.

Many different methods exist for controlling the regulation of the output quantity Vout or Iout. One group of methods are based on pulse-width modulation (PWM), and include methods such as "duty cycle control," "peak current-mode control," and "average current-mode control." The duty cycle control method sets the quantity Ψ as the ratio between the time during which a power switch is closed, $T_{ON}$, to the switching period $T_{sw}$. The peak current-mode control method sets the quantity Ψ to the peak current flowing through the energy storage magnetic device. The average current-mode control method is similar to the peak current-mode method, but sets the quantity Ψ to the average current flowing through the energy storage magnetic device.

In addition to PWM control methods, there are also pulse frequency modulation (PFM) methods, where the switching frequency $f_{sw}$ is variable. These include the "direct frequency control" method, where Ψ is the switching frequency of the converter; and the "time-shift control" method, where Ψ is the amount of time from a zero-crossing of the current in the energy storage magnetic device to the next change of state of the power switches.

Another important characteristic of the power circuit 26 that impacts how the control circuit is implemented, in particular the way the control signal ($V_c$ or $I_c$) is passed on to the modulator, is whether the converter is isolated or non-isolated. This "isolation" refers to the existence of an electrical barrier between the input and output of the converter.

FIG. 3A shows a non-isolated converter 40, which has a common ground terminal for both the input and the output. The electrical connection between the input and output make them simple and cost efficient, but limits their usage to certain applications, such as Point Of Load (POL) converters.

Non-isolated converters do not need any special electrical provision to provide the control signal to the modulator. If the circuits are properly combined, the output of the signal conditioning circuit can be connected directly to the modulator input.

However, many safety agency bodies or customers require a separation from the applied input voltage and the output voltage, which is often user accessible. FIG. 3B shows such an isolation barrier 42 for a dc-dc converter 44. The isolation barrier 42 is a high frequency transformer, which removes the direct electrical connection from the input to the output.

With isolated converters, the power is switched on the input side (commonly referred to as the primary side), but under control from the output side (commonly referred to as the secondary side) in order to provide proper regulation. This requirement introduces an additional problem, namely that signals from the secondary side are transmitted to the primary side. The requirement for primary side switching to be controlled by secondary side characteristics requires a second connection crossing the isolation barrier in order to feed the control signal ($V_c$ or $I_c$) back to the primary side. Although this path involves only information, rather than power, it should still be isolated.

FIG. 4 shows a common inexpensive solution to this problem. In this arrangement a three-pin adjustable shunt regulator 46 is used as secondary reference/error amplifier that drives an optocoupler 48 to regulate the output voltage and transfer the control signal to the primary side.

With this circuit arrangement output voltage changes Δ Vout are represented by corresponding changes $\Delta I_{\Phi}$ in the current $I_{\Phi}$ flowing through the photodiode. The current $I_{\Phi}$ determines a proportional change $\Delta I_c$ in the current $I_c$ drawn by the phototransistor. This current drives the modulator directly, or is first converted into a voltage before being fed into the modulator.

Another solution to avoiding isolation problems is to eliminate the feedback. An example of one prior art approach to a "no overall feedback" converter is shown in FIG. 5. This converter 50 uses the same low-voltage, primary-referenced auxiliary winding that supplies power to the control circuit, but in this case a non-isolated feedback loop is used to force the control IC to regulate its own supply voltage. The theory is that if the diode voltage drops are matched, and the transformer windings well coupled, the isolated output voltage will track this regulated primary-referenced auxiliary voltage. However, the performance offered by this approach, commonly referred to as Primary Sensing Regulation (PSR), in terms of regulation and accuracy is worse than the circuit of FIG. 4.

BRIEF SUMMARY

According to one embodiment of the present disclosure, a switching converter being controlled by a control unit is provided. The control unit includes a signal conditioning circuit that controls a driver, which drives a power stage of the switching converter.

The control unit includes a comparator configured to receive a reference signal and a measured value signal representative of an output electrical quantity of a power stage of a switching converter, the comparator being configured to produce a detection signal based on a comparison of the measured value signal and the reference signal. A control actuator is coupled to the comparator and is configured to produce a correction signal based on the detection signal. An averaging circuit is coupled to the control actuator and configured to produce a control signal by averaging the correction signal, the control signal being configured to drive the power stage of the switching converter.

According to a further embodiment, the control actuator includes a monostable oscillator configured to produce the correction signal.

According to another embodiment, the control actuator further includes a counter coupled to the monostable oscillator and configured to reduce a frequency of the correction signal.

In another embodiment, the control actuator further includes a logic gate configured to receive the detection signal and a clock signal, and to produce a logic signal to the monostable oscillator.

In accordance with one embodiment, the control actuator further includes a clock configured to produce a clock signal and a set-reset flip-flop having a set input configured to receive the detection signal and a reset input configured to receive the clock signal. In some further embodiments the control actuator further includes a counter configured to reduce a frequency of the correction signal. In other further embodiments the control actuator further includes a time delay circuit coupled between the clock and the reset input of the flip-flop and configured to delay the clock signal and a logic gate configured to receive the clock signal and an output of the flip-flop, and to produce a logic signal to the monostable oscillator, the monostable oscillator being configured to produce the correction signal based on the logic signal.

BRIEF DESCRIPTION OF THE SEVERAL VIEWS OF THE DRAWINGS

FIG. 8 shows another embodiment of a control actuator suitable for dc signals and its associated waveforms according to the present disclosure.

FIG. 9 shows another embodiment of a control actuator suitable for dc signals and its associated waveforms according to the present disclosure.

FIG. 17 shows the output characteristic and the relative regulation error of the converter shown in FIG. 13@ Vin=400 Vdc, sweeping Vout from 0 to 12 Vdc.

DETAILED DESCRIPTION

Certain types of loads for converters are relatively constant or slowly changing, or else do not require fast dynamic response or tight regulation. Other types of loads are tolerant to the voltage ripple superimposed on the dc value. In these cases, it would be convenient to have a simpler implementation of the feedback loop, without an error amplifier or frequency compensation. Additionally, this implementation should lend itself to implementing primary side regulation (PSR) and enable regulation of the output voltage or current Vout or Iout using only quantities available on the primary side of the converter.

One embodiment of the present disclosure is directed to a converter having a control unit aimed to implement a simple signal conditioning circuit that generates the control signal (either $V_c$ or $I_c$), without using a large number of fine-tuning components.

An embodiment of the present disclosure is based on the fact that when the feedback loop is open, a converter is normally designed to provide more power than the maximum value demanded by the load. This extra power capability is used to account for tolerances in the components of both the power stage and the control unit, to make sure that it will be able to provide the maximum power demanded by the load. The extra power capability also allows the converter to achieve a satisfactory transient response when the load demand is close to the maximum, so that this extra power can be used to quickly compensate for the temporary power unbalance and bring the regulated quantity quickly back to the setpoint.

The correction action exercised by a control unit according to one embodiment of the present disclosure will therefore cause the converter work below its "natural" capability. This happens because, without this action, the demand/delivery power unbalance would make the regulated quantity exceed the setpoint. This means that the correction action is performed when the regulated quantity tends to exceed the setpoint, and is not performed if the regulated quantity is below the setpoint. Power balance can be obtained with a discontinuous correction action from the part of the control unit upstream the modulator, unlike the prior art system described in FIG. 2 that exercises its correction action continuously.

Figure 1:
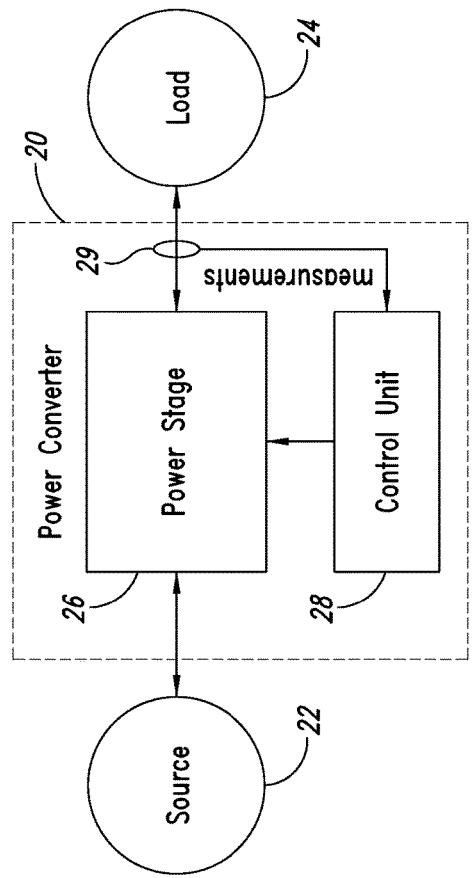
FIG. 1 shows a block diagram of a power converter according to the prior art.
Figure 2:
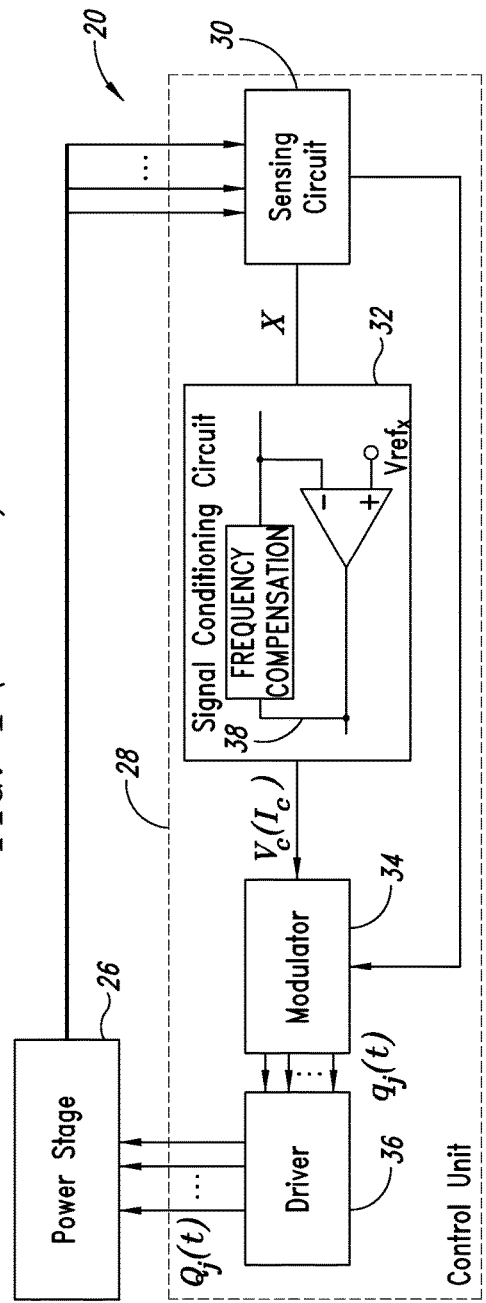
FIG. 2 shows a block diagram of the control unit included in the power converter of FIG. 1.
Figure 3A:
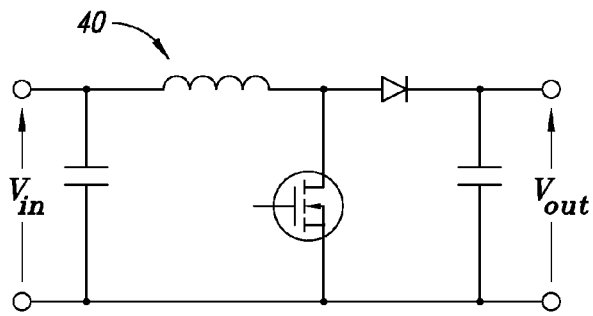
FIG. 3a shows a typical non-isolated converter according to the prior art.
Figure 3B:
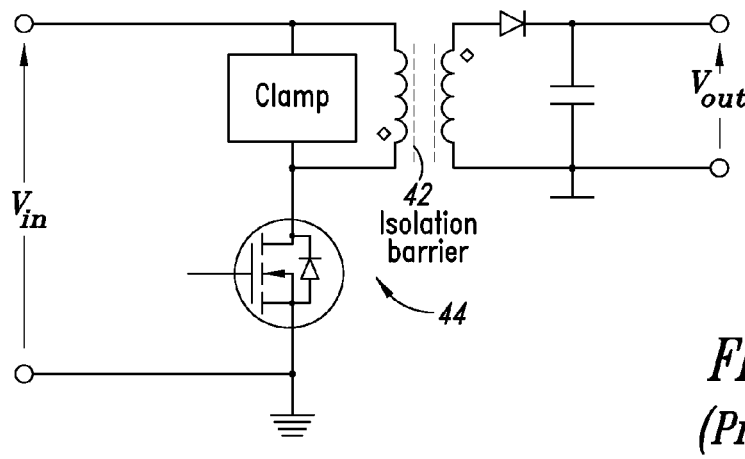
FIG. 3b shows a typical isolated converter according to the prior art.

The converter of the present disclosure should still function with a standard modulator structure and sensing circuit and, as shown in FIG. 2, typical modulators use a continuous control signal (Vc or Ic). Therefore the discontinuous correction action of the control unit is averaged in order to produce a continuous control signal to the modulator.

Figure 6:
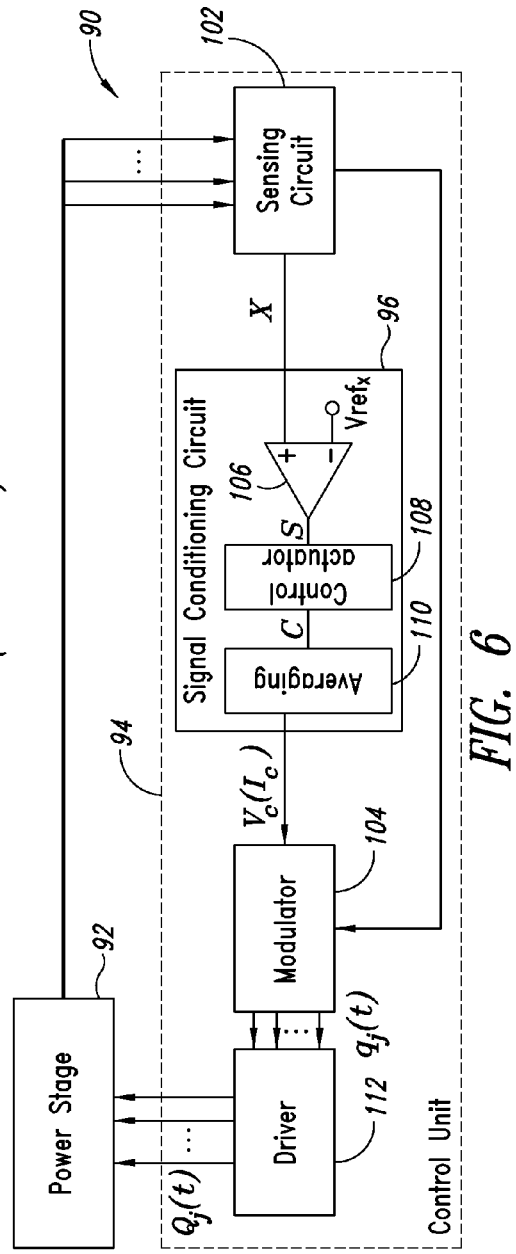
FIG. 6 shows a control unit according to one embodiment of the present disclosure.

FIG. 6 shows a switching converter 90 having a power stage 92 and a control unit 94 forming a feedback loop to regulate the output voltage Vout or output current Iout provided by the power stage. The control unit 94 functions similarly to the control unit 28 of FIG. 2, however uses a different signal conditioning circuit 96 to produce the control voltage $V_c$ or control current $I_c$.

The control unit 94 performs three conceptual functions: first, detecting whether a correction action is desired or not; second, performing the correction action if desired; and third, averaging the correction action over time in order to produce a continuous control signal $V_c$ or $I_c$.

A sensing circuit 102 measures the quantity to be regulated, Vout or Iout from the power stage 92, and produces a measured value signal X, which is received by the signal conditioning circuit 96. The sensing circuit 102 also produces additional measured electrical quantities to a modulator 104.

The signal conditioning circuit 96 includes a comparator 106, which receives the measured value signal X, and a reference value Vrefx that represents the setpoint. The comparator 106 determines if the measured value signal X is greater than the reference value Vrefx or not, and outputs a digital detection signal S based on the comparison. Generally, the signal S will be high if the measured value signal X is greater than the reference value Vrefx, and low if the measured value signal X is less than the reference value Vrefx. However in other embodiments the signal S may be low when the measured value signal X is greater than the reference value Vrefx. The comparator 106 therefore acts digitally, producing only high/low signal. This is contrary to the operational amplifier and passive network of the converter 20 of FIG. 2, which operates as an analog amplifier, outputting a continuous control signal Vc(Ic).

Figure 4:
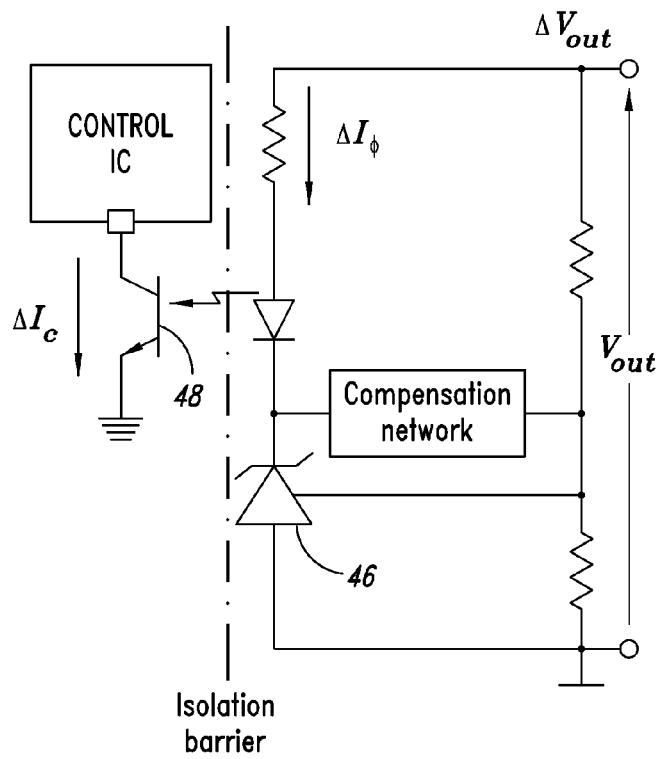
FIG. 4 shows an isolated feedback network based on a shunt regulator and an optocoupler according to the prior art.
Figure 5:
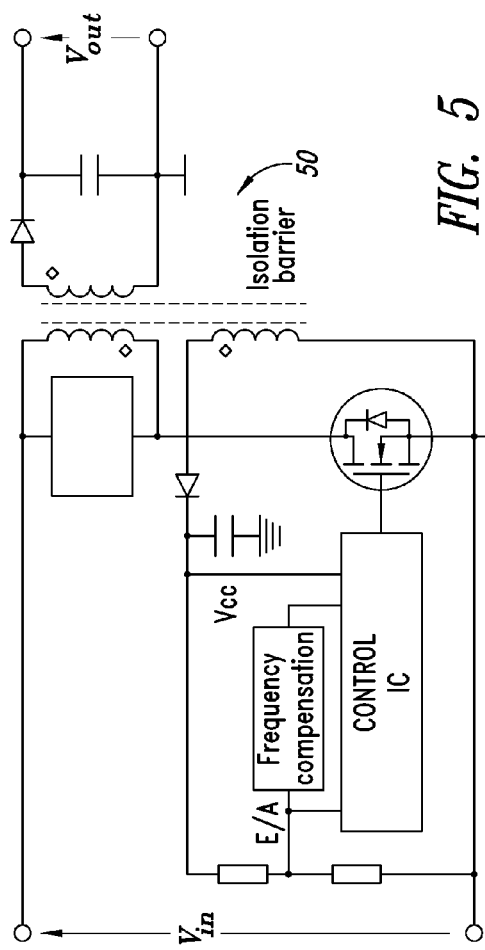
FIG. 5 shows a converter with Primary Sensing Regulation (PSR) according to the prior art.

In one embodiment, the converter may be operated with primary side regulation. For primary side regulation, the comparator 106 will be located on the primary side and its output can be managed directly by the downstream circuits. In other embodiments, the converter 90 may be operated with the comparator 106 on the secondary side using isolated feedback methods. In the case of isolated feedback, the output of the comparator 106 can be transferred to the primary side via an optocoupler. Compared to the converter of FIG. 4, where the optocoupler linearly transfers a continuous quantity from the secondary side to the primary side, an embodiment of the converter 90 would use an optocoupler (not shown) that works digitally, transferring only high/low level information. Because the digital optocoupler of the converter 90 would only transfer a high/low value, it is not susceptible to a decrease in performance as the component naturally ages.

The output of the comparator 106 is coupled to a control actuator 108, which creates a corrective action by producing a correction signal C based on the state of the signal S. When the comparator 106 determines that the measured value signal X is greater than the setpoint, a correction action is performed and the control actuator 108 will produce the correction signal C.

The control actuator 108 may be one of several different embodiments depending on the type of measured value signal X provided by the sensing circuit to the comparator 106. There are two basic cases for the measured value signal X: the signal has a dc value with a small ripple superimposed on top of it; and the signal has a ripple amplitude comparable with its dc value. Various embodiments of the control actuator 108 will be discussed below with reference to FIGS. 7-11 as they apply to these two types of measured value signal X.

The correction signal C can be produced synchronously with the switching activity of the converter 90 or asynchronously. Synchronous timing can be performed every switching cycle, every other cycle, every n cycles, or k times in a switching cycle. Furthermore, synchronization may affect either the beginning of the correction action, the end of the correction action, or both.

Although the correction signal C is discontinuous based on the measured value signal X, the signal conditioning circuit 96 still functions with the modulator 104, which uses a continuous control signal $V_c$ or $I_c$. Therefore the discontinuous correction signal C of the control actuator 108 is averaged in order to generate a continuous control signal to the modulator 104. An averaging circuit 110 receives the discontinuous correction signal C, and produces a continuous control signal $V_c$ or $I_c$ based on the average of the correction signal C over time. Several possible embodiments of the averaging circuit 110 will be discussed below with respect to FIGS. 12A-12C.

The modulator 104 produces signal $q_j(t)$ to a driver 112, which drives the power stage 92. The driver 112 generally includes an amplifier and level shifters, and produces signals Qj(t) which have sufficient amplitude to drive the power switches of the power stage 92.

Figure 7:
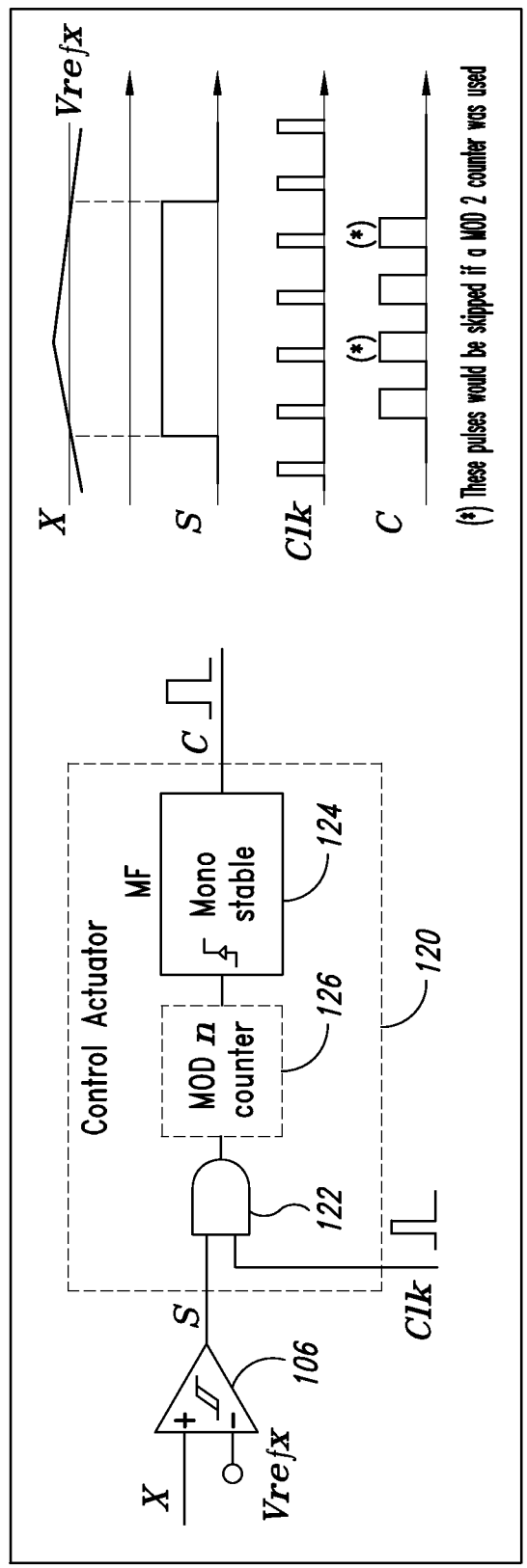
FIG. 7 shows an embodiment of a control actuator suitable for dc signals and its associated waveforms according to the present disclosure.

FIG. 7 shows a first possible embodiment of a control actuator 120 that could be employed as the control actuator 108 of FIG. 6, along with its associated waveforms. The control actuator 120 is preferably used with dc signals, where changes in the measured value signal X are relatively slow. The control actuator 120 includes a logic gate 122, such as an AND gate, and a monostable oscillator 124. The logic gate 122 receives the signal S from the comparator 106 at a first input, and a clock signal Clk at a second input. In some embodiments, the control actuator 120 may also include a MOD n counter that is configured to count pulses up to a value n before resetting. The output S of the comparator 106 will be either low or high depending on whether the measured value signal X is lower or greater than the reference value Vrefx. If the measured value signal X is greater than the reference value, the comparator 106 preferably outputs a high signal.

If the measured value signal X is lower than the reference value Vrefx, i.e. if S is low, no corrective action takes place at the control actuator 120. If the measured value signal X is greater than the reference value, i.e. if S is high, then the clock pulses Clk are transferred by the AND gate 122 to the input of the monostable oscillator 124. The clock pulses Clk are preferably generated synchronously to the switching activity of the converter. For example, the clock pulses may be generated by a local oscillator that determines the switching frequency $f_{sw}$ or by a circuit sensing that one or more power switches in the converter have been turned on or off. The monostable oscillator 124 is preferably sensitive to the rising edges of the input pulses, so it releases correction signal C synchronously to the Clk signal. The duration of these correction signal pulses C may be of a fixed duration, or variable, such as a given percentage of the switching period.

The upper limit of the regulation range is reached when the corrective action takes place every switching cycle. If the corrective action is to be performed no more that every n switching cycles it is possible to use the MOD n counter 126 between the output of the logic gate 122 and the input of the monostable oscillator 124. Alternatively, the counter 126 could be used downstream of the monostable oscillator 124 or between the Clk signal generator and the logic gate 122. FIG. 7 shows the waveforms for a MOD n counter with n=2.

FIG. 8 shows a control actuator 140 that is suitable for dc signals according to a second possible embodiment of the control actuator 108 of FIG. 6, along with the associated waveforms. The control actuator 140 includes a set-reset flip-flop 142, having a set input coupled to the output of the comparator 106, and a reset input coupled to the clock signal Clk. Preferably, the flip-flop 142 is level-sensitive and reset-dominant. The detection signal S of the comparator 106 will be either low or high depending on whether the measured value signal X is lower or greater than the reference value Vrefx.

If the measured value signal X is lower than the reference voltage Vrefx, no control action takes place. If the measured value signal X is greater than the reference voltage Vrefx, the SR flip-flop 142 is set and its output Q goes high, as well as the correction signal C. The flip-flop 142 is reset by the clock pulses Clk, generated synchronously to the switching activity of the converter, so that the output Q goes low when clock pulses are generated. However, when the signal S is still high, the output Q will be low only while the pulse Clk is high at the reset input and will go back high as the pulse Clk goes low. In other words, as long as S is high, C=Q=$\overline{\text{Clk}}$.

The upper limit of the regulation range is reached when the control action takes place every switching cycle. If the control action is to be performed not more frequently that every n switching cycles it is possible to use the MOD n counter 126 between the output of the AND gate and the input of the monostable MF. In other embodiments, the MOD n counter may be between the Clk signal generator and the SR flip-flop 142. The waveforms of FIG. 7 show the output C for a MOD n counter 126 having n=2.

FIG. 9 shows a control actuator 150 that is suitable for dc signals according to a third possible embodiment of the control actuator 108 of FIG. 6, along with the associated waveforms. The control actuator 150 includes an oscillator 152 having an input coupled to the detection signal S of the comparator 106. The detection signal S of the comparator 106 will be either low or high depending on whether the measured value signal X is lower or greater than the reference value Vrefx.

If the measured value signal X is lower than the reference value Vrefx, no control action takes place. If the measured value signal X is higher than the reference value Vrefx, the oscillator 152 is enabled and delivers at its output the correction signal C at a frequency and duty cycle that can be either fixed or variable. The operation is generally asynchronous unless the oscillator 152 is synchronized to the switching frequency, and may take place more times in a switching cycle if the oscillator frequency is larger than the switching frequency. The upper limit of the regulation range is reached when the oscillator is continuously running.

Figure 10:
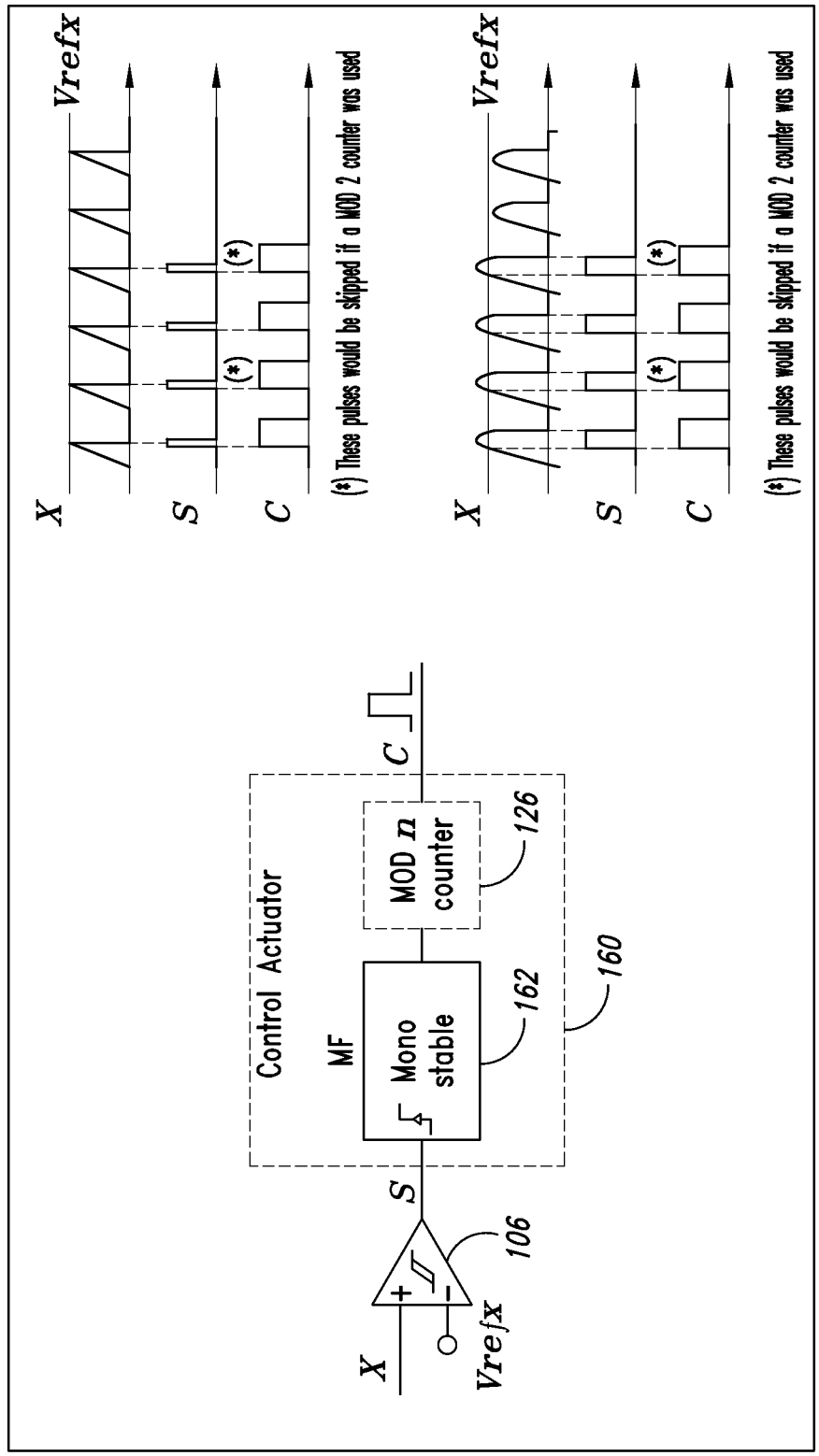
FIG. 10 shows an embodiment of a control actuator suitable for signals with a substantial ac component and its associated waveforms according to the present disclosure.

FIG. 10 shows an embodiment of a control actuator 160 suitable for signals with a substantial ac component, which could be employed as the control actuator 108 of FIG. 6, and its associated waveforms. The control actuator 160 includes a monostable oscillator 162 having an input that receives the signal S from the comparator 106. In some embodiments, the control actuator 160 may also include the MOD n counter 126. The output S of the comparator 106 will be either low or high depending on whether the measured value signal X is lower or greater than the reference value Vrefx. Unlike the previous cases, where the measured value signal X could stay above or below the reference value Vrefx for more consecutive switching cycles, in this case the measured value signal X changes rapidly and only exceeds the reference value for a short time interval within each switching cycle.

The waveforms in FIG. 10 show two cases where the measured value signal X is representative of the current flowing in a power switch. The first case, shown in the upper waveforms, is that of a PWM-controlled converter where the conduction cycle of the power switch is terminated when the peak current reaches the Vrefx level. The second case, shown in the bottom waveforms, is that of a resonant converter where the power switch is not switched off when the Vrefx level is reached.

If the measured value signal X does not reach the reference value Vrefx within a switching cycle, the signal S stays low and no control action takes place. If, within a switching cycle, the measured value signal X reaches the reference value Vrefx then the comparator 106 detection signal S is asserted high. In the case of a PWM-controlled converter, shown in the upper waveforms, since the measured value signal X reaching Vrefx also causes the power switch to be switched off, the signal S will be a series of short pulses. For a resonant converter, shown in the lower waveforms, since the power switch is not switched off by the measured value signal X reaching Vrefx, the duration of the pulses S will be longer.

The cascaded monostable oscillator 162 is generally sensitive to the rising edges of the input pulses, so it releases a correction signal pulse C at its output every time the detection signal S is asserted high. In some other embodiments, the signal S may become low when the measured value signal X is greater than the reference value Vrefx. In the embodiment where the signal S becomes low, the oscillator 162 will release a correction signal pulse C when the signal S is asserted low. The duration of the pulses C may be fixed, like in the example shown in FIG. 10, or variable, such as a given percentage of the switching period. Because the correction signal C is based on the measured value signal X, the control actuator 160 has a control action that is inherently synchronized to the switching frequency.

The upper limit of the regulation range is reached when the control action takes place every switching cycle. If the control action is to be performed not more frequently that every n switching cycles it is possible to use the MOD n counter 126 either downstream or upstream the monostable oscillator 162. FIG. 10 shows waveforms for the MOD n counter 126 with n=2.

Figure 11:
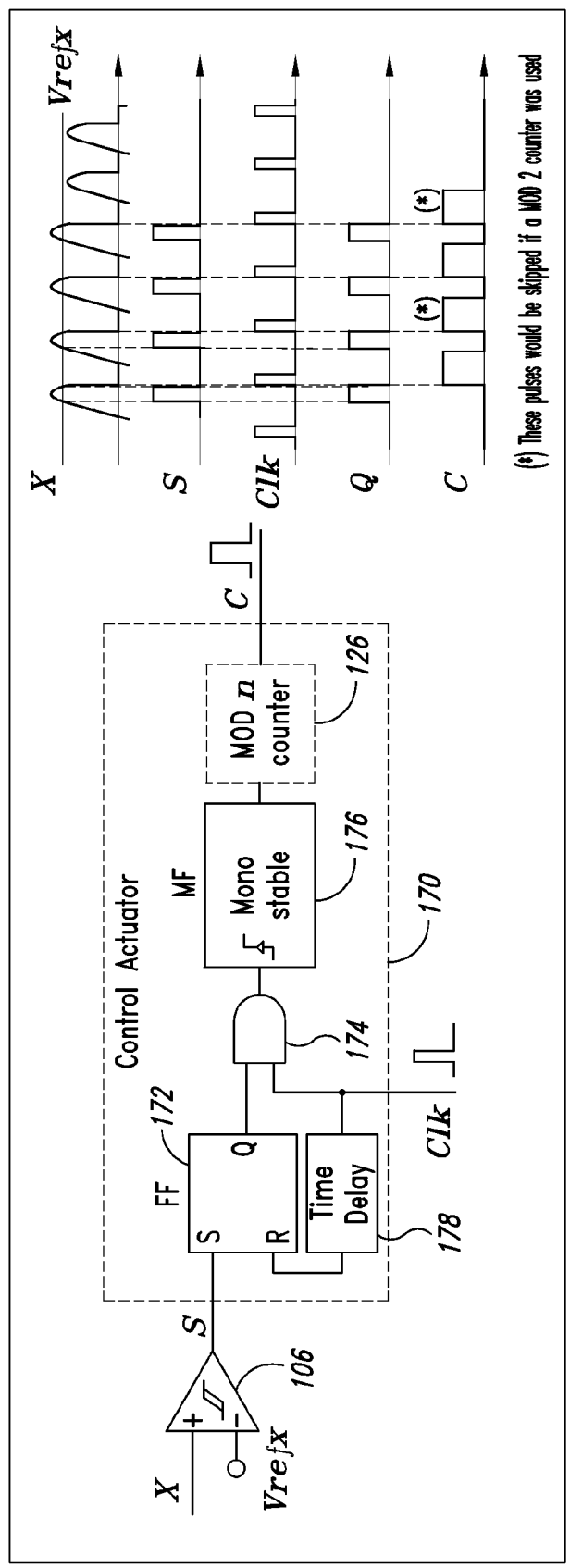
FIG. 11 shows another embodiment of a control actuator suitable for signals with a substantial ac component and its associated waveforms according to the present disclosure.

FIG. 11 shows a control actuator 170 for use with measured value signals X having a substantial ac component, according to a second embodiment which could be used as the control actuator 108 of FIG. 6, and its associated waveforms. The control actuator 170 includes a SR flip-flop 172 having a set input connected to the output S of the comparator 106, a logic gate 174 and a monostable oscillator 176. The logic gate 174 has a first input coupled to the output Q of the flip-flop 172, and a second input coupled to a clock signal Clk. The clock signal Clk is also received at a time delay circuit 178, which delays the clock signal by a specified amount of time, and then feeds the delayed clock signal to the reset input of the SR flip-flop 172.

If the measured value signal X does not exceed the reference level Vrefx the signal S stays low and no control action takes place. If the measured value signal X reaches the reference level Vrefx within a switching cycle, the signal S is asserted high and this event is stored in the SR flip flop 172. Preferably, the SR flip flop 172 is edge-sensitive, reset dominant, and therefore set by the positive-going edge of S, causing the output Q to go high. In this way, the pulses Clk generated synchronously to the switching activity of the converter are transferred by the logic gate 174 to the input of the monostable oscillator 176. The oscillator 176 is preferably sensitive to the rising edges of the input pulses, so it releases correction signal pulses C at its output synchronously to the Clk signal. The duration of these pulses C may be fixed or variable. The pulses Clk are fed into the time delay circuit 178 in order to prevent race conditions. The delayed clock signal is then received at the reset input of the flip flop 172, forcing its output Q low so that the flip-flop 172 is ready to respond in the next switching cycle.

The upper limit of the regulation range is reached when the control action takes place every switching cycle. If the control action is to be performed not more frequently that every n switching cycles it is possible to use the MOD n counter 126 downstream the monostable oscillator 176, upstream from the oscillator 176, or between the Clk signal generator and the logic gate 174 input, preferably after the connection via the time delay block to the reset input of flip-flop 178 in order to avoid altering the delayed clock signal received at the reset input.

Figure 12:
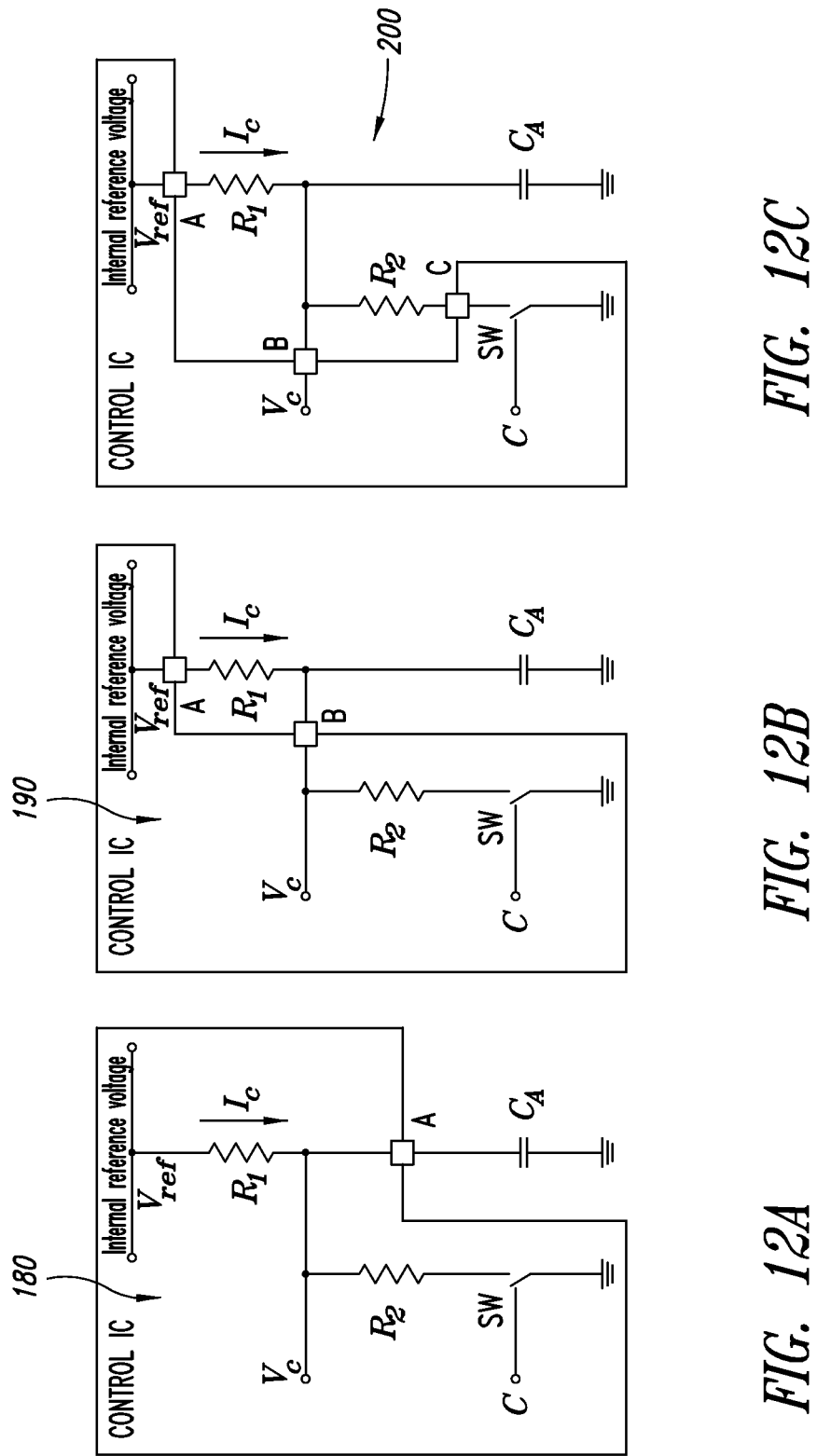
FIG. 12A shows an embodiment of an averaging circuit according to the present disclosure.
FIG. 12B shows another embodiment of an averaging circuit according to the present disclosure.
FIG. 12C shows another embodiment of an averaging circuit according to the present disclosure.

FIG. 12A shows an averaging circuit 180 that could be used to implement the averaging circuit 110 of the converter of FIG. 6. The averaging circuit 180 receives the correction signal C and averages the control action to produce a control voltage V or control current $I_c$. The averaging circuit 180 includes a first resistor $R_1$, a second resistor $R_2$, an averaging capacitor $C_A$, and a switch SW that is controlled by the correction signal C. The averaging circuit 180 is coupled to an internal reference voltage Vref, and outputs the control voltage V and control current $I_c$.

When the correction signal C is low, the control voltage $V_c$ equals the internal reference Vref and the control current $I_c$ is zero. In other embodiments, the switch SW may close when the correction signal C is low, causing the control voltage Vc to equal the internal reference voltage when the signal C is high. When the control action is continuous, denoting with δ the duty cycle of the signal C, and assuming for simplicity that they occur every switching cycle (no MOD n counter is used), the control voltage and current are:

$$V_c = Vref \frac{R_2}{R_2 + \delta R_1}; \quad I_c = \frac{\delta Vref}{R_2 + \delta R_1}. \tag{1}$$

In this way the regulation range of the control signal $V_c(I_c)$ is identified. To achieve a significant averaging effect, the averaging capacitor $C_A$ is preferably such that:

$$\tau_A = C_A \frac{R_1 R_2}{R_2 + \delta R_1} \gg T_{sw}. \tag{2}$$

In a converter operating at a variable frequency this condition is preferably fulfilled all over the operating frequency range ($f_{sw\text{-}min}$, $f_{sw\text{-}max}$), i.e. $\tau_A \gg T_{sw\text{-}max} = 1/f_{sw\text{-}min}$.

As the value of the capacitor $C_A$ becomes larger, the residual low frequency ripple of both the control signal and the controlled quantity Vout or Iout will become lower. However, the value of the capacitor $C_A$ also affects also the time needed for $V_c$ to transition from one steady-state value to another in case of change in the operating conditions and, consequently, the closed-loop dynamic response of the converter. The value of the capacitor $C_A$ is therefore selected considering these two contrasting desires.

In the averaging circuit 180, resistors $R_1$ and $R_2$ are internally fixed and so is the regulation range of $V_c$ and $I_c$. The only user-programmable parameter is the time constant $\tau_A$ through the selection of the value of the capacitor $C_A$. One advantage of this circuit is that it uses only one pin in a hypothetical control IC.

FIG. 12B shows another embodiment of an averaging circuit 190 that could be implemented as the averaging circuit 110 of FIG. 6. In the averaging circuit 190, the second resistor $R_2$ is internally fixed, while the first resistor $R_1$ and capacitor $C_A$ are user selectable. This allows the user to program both the regulation range of the control signal $V_c$ ($I_c$) by choosing $R_1$ and the time constant $\tau_A$ through the selection of $C_A$. This averaging circuit 190 uses two pins in a control IC.

FIG. 12C shows a third embodiment of an averaging circuit 200 that could be implemented as the averaging circuit 110 of FIG. 6. The averaging circuit 200 has user selectable resistors $R_1$ and $R_2$ and charging capacitor $C_A$. This averaging circuit 200 provides the user with an additional degree of freedom in selecting component values to satisfy specific requirements.

Figure 13:
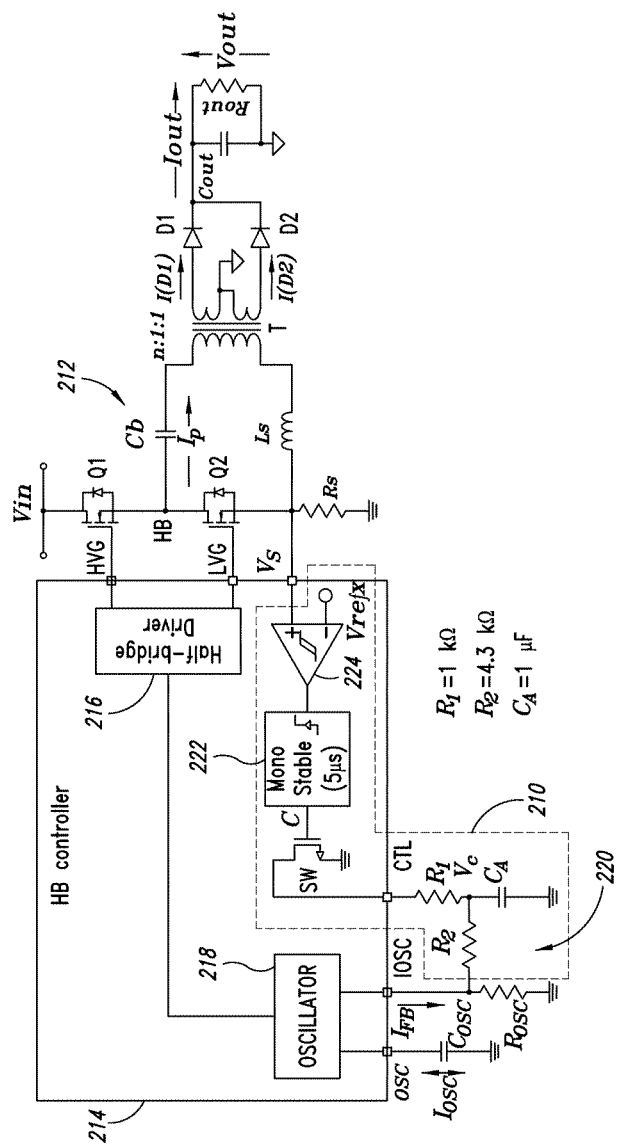
FIG. 13 shows a switching converter having a control actuator and an averaging circuit according to one embodiment of the present disclosure.

FIG. 13 illustrates a signal conditioning circuit 210 in use on a switching converter 212 according to one embodiment. The converter 212 is a half-bridge single acting bridge ("HB-SAB") converter according to one embodiment, but may be any suitable converter. For the sake of simplicity, any form of voltage limitation or regulation, which may be used to protect the unit in case of a load that is too light or disconnected, is not described. According to one embodiment, the converter 212 is specified to provide a nominal output current $Iout_{nom} = 22A$ in a 0-12 V output voltage range, starting with a regulated input voltage Vin=400 Vdc.

The converter 212 has a totem-pole of transistors Q1 and Q2 connected between the input voltage Vin and ground and controlled by a control circuit 214. The common terminal HB between the transistors Q1 and Q2 is connected in series with a capacitor Cb, an inductor Ls and a transformer T with a center-tap secondary. The two windings of the center-tap secondary are connected to the anodes of two diodes D1 and D2, whose cathodes are both connected to the parallel of a capacitor Cout and a resistance Rout. The dc output voltage Vout of the converter is across the parallel Rout, Cout circuit while the dc output current Iout flows through Rout. A half-bridge driver 216, included in the controller 214, switches the two power MOSFETs Q1 and Q2 on and off in phase opposition for the same time period. In some embodiments, a small dead time is inserted between the turn-off of either switch and the turn-on of the complementary one. This dead time ensures that Q1 and Q2 will not cross-conduct and that they will work with soft-switching. As a result, the voltage applied to the power stage will be a square-wave at a frequency $f_{sw}$ with 50% duty cycle that swings all the way from 0 to Vin.

Figure 14:
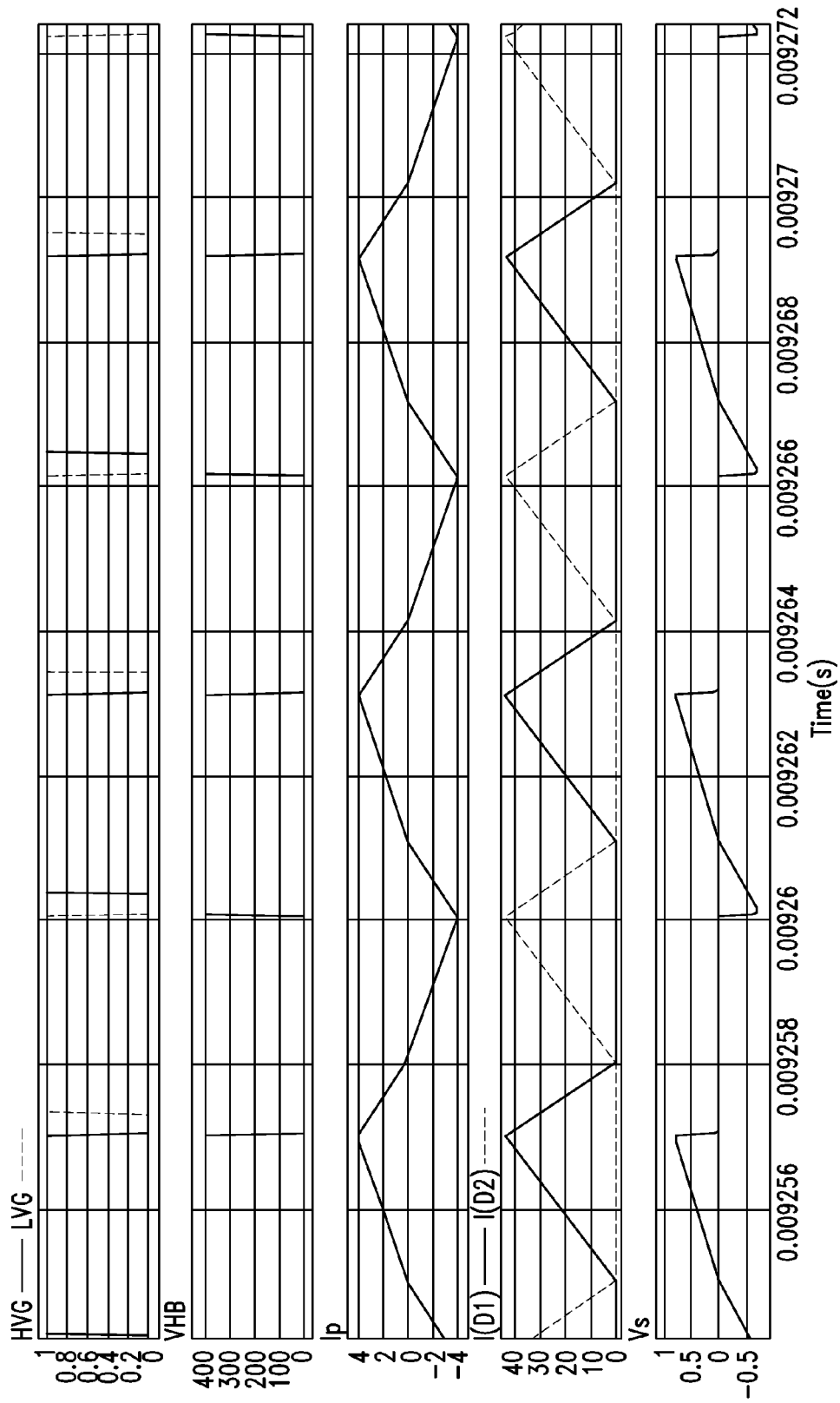
FIG. 14 shows the waveforms of the power circuit of FIG. 13.

FIG. 14 shows the key steady-state waveforms of the converter 212 of FIG. 13. The primary current Ip is a series of triangles alternately positive and negative. The average value of the primary current Ip is zero because of the blocking capacitor Cb, which has a dc voltage equal to Vin/2. The secondary currents delivered by each secondary half-winding, I(D1) and I(D2), have the same triangular shape and their superposition through D1 and D2 makes the current $I_s$ delivered to the parallel of Cout and Rout a series of positive triangles at a frequency $2f_{sw}$.

The transformer T is constructed to be as close to an ideal transformer as possible. Therefore, if n is the primary-to-secondary turn ratio, the secondary currents will be exactly n times the primary current at any time:

$$Is = n|Ip|. \tag{3}$$

This equation applies not only to the instantaneous values but also to the peak, rms and dc values. In particular, since the dc value of Is is the output current Iout, the output current can be written as:

$$Iout = n|Ip|_{dc}. \tag{4}$$

Considering the triangular shape of Ip, $|Ip|_{dc}$ will be half the peak $Ip_{pk}$:

$$Iout = \frac{1}{2} n Ip_{pk}. \tag{5}$$

If the peak of the primary current Ip is kept constant, this will result in the output current being regulated at a constant value given by equation (5). This results in primary sense regulation and can be done by sensing the primary current Ip via a sensing resistor (Rs) and comparing the voltage Vs developed across Rs to the reference value Vrefx:

$$Iout = \frac{1}{2} n \frac{Vrefx}{Rs}. \tag{6}$$

Regulation is performed by changing the frequency of this square-wave, i.e. the switching frequency of the half-bridge. An increase in the switching frequency will result in the transferred power going down and vice versa. Therefore the half-bridge controller 214 is equipped with a programmable oscillator 218, preferably realized with an external capacitor Cosc connected between one pin OSC of the controller and ground. The capacitor Cosc is alternately charged and discharged by a current $I_{OSC}$ defined by the current $I_{FB}$ sourced by the pin IOSC. The pin IOSC appears externally as a voltage reference Vref able to source current. With reference to the converter 90 of FIG. 6, the oscillator 218 plays the role of the modulator 104.

The averaging circuit 220, made up of the components $R_1$, $R_2$, and $C_A$ is connected to the IOSC pin. The dc voltage $V_c$ across the capacitor $C_A$ defines the control current $I_c=(Vref-V_c)/R_1$ sunk from the pin IOSC. The currents $I_{FB}$ and $I_{OSC}$ that determine the operating frequency of the half-bridge are defined in part by $R_{OSC}$. $R_{OSC}$ in part sets the minimum switching frequency. As the load resistance Rout is reduced, so that less power is demanded by the load (Pout=Iout²Rout), the control action should be more frequent, so there are more correction signal C pulses and the voltage $V_c$ across $C_A$ decreases, thus increasing $I_{FB}(I_{OSC})$ and increasing the switching frequency. The increased switching frequency achieves the demand/delivery power balance. Increasing the load resistance Rout will lead to a consistent response of the control circuit as well.

The control action is performed by the switch SW driven by a control actuator 222. According to one embodiment, the control actuator 222 is a monostable oscillator that delivers 5 μs wide pulses as the detection signal S of the comparator 224 goes high. The drain terminal of SW is available on pin CTL to discharge $C_A$ through $R_1$ when SW is on.

Figure 15:
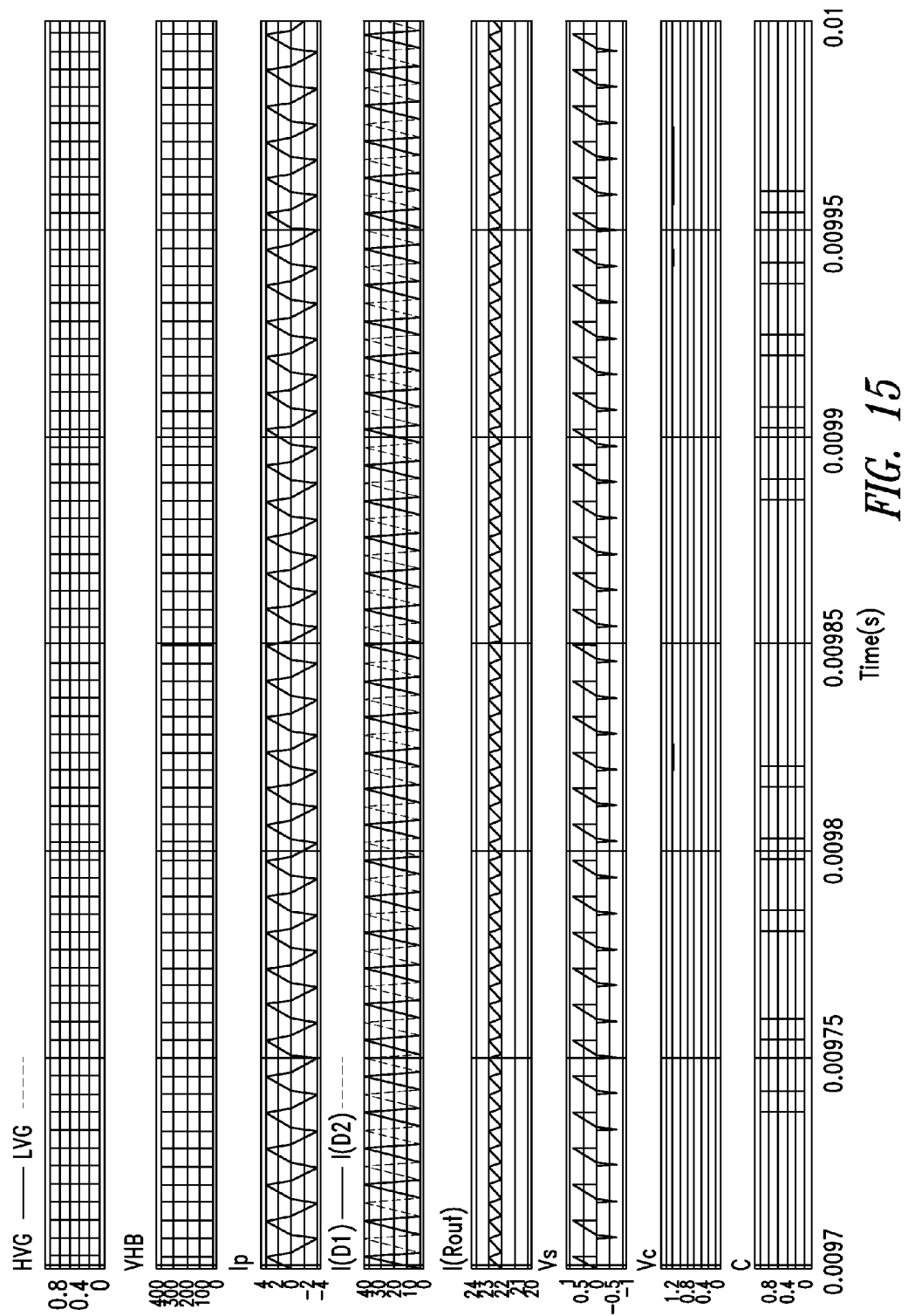
FIG. 15 shows the waveforms resulting from a simulation of the converter shown in FIG. 13@ Vin=400 Vdc, Rout=0.5Ω, and Iout regulated at 22.2 A.

FIG. 15 shows the results of a simulation of the converter 212. In addition to the waveforms shown in FIG. 14, the output current I(Rout), control voltage $V_c$ across $C_A$ and correction signal C are shown. With a 400 VDC input voltage and a load resistance Rout of 0.5Ω the current is regulated at 22.2 A, so the output voltage Vout is 11.1 V.

Figure 16:
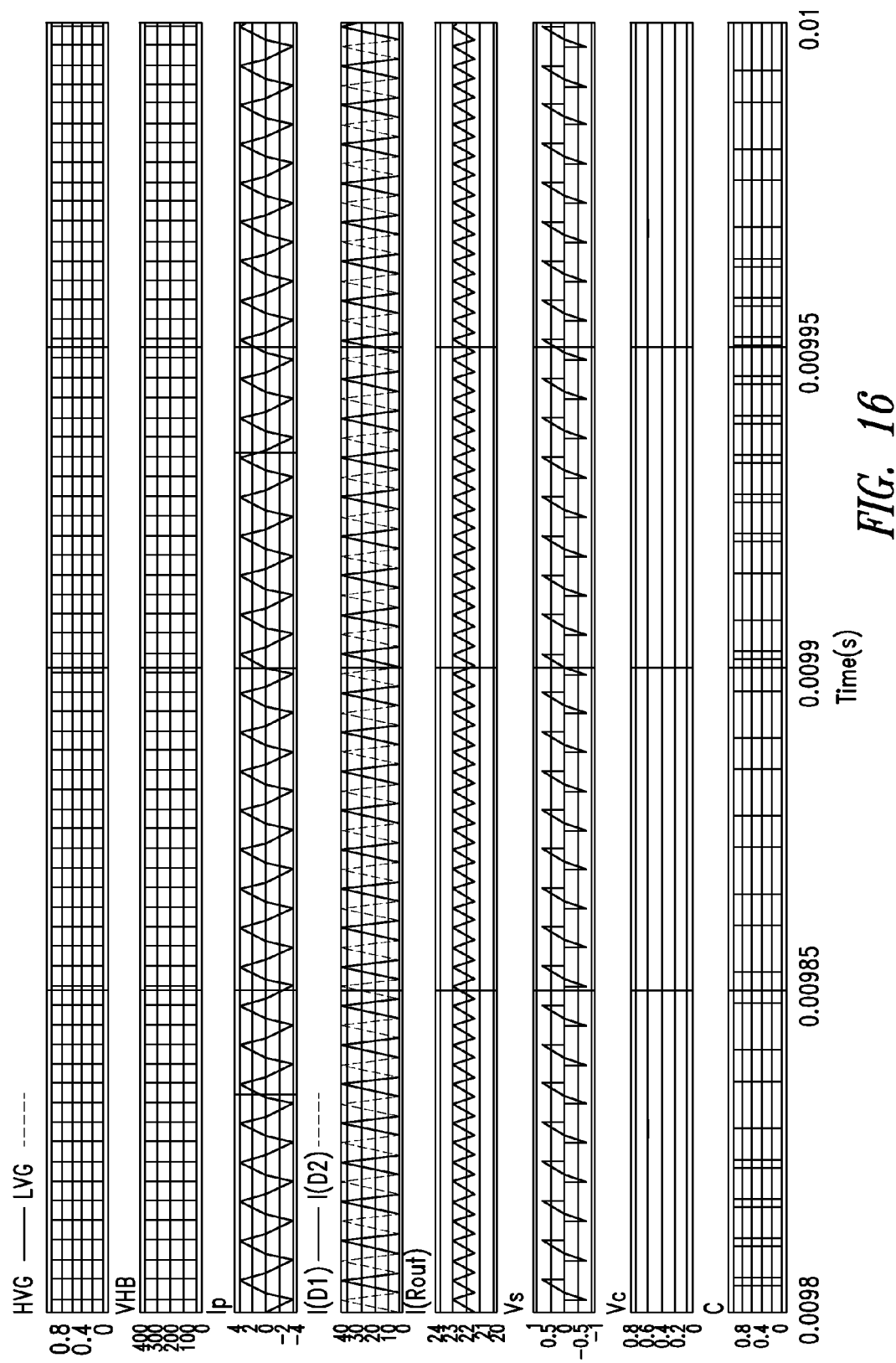
FIG. 16 shows the waveforms resulting from a simulation of the converter shown in FIG. 13@ Vin=400 Vdc, Rout=0.25Ω. Iout is regulated at 22.2 A (+0.91% wrt the target).

FIG. 16 shows the simulated waveforms of the converter 212, with a 400 VDC input voltage and a load resistance Rout of 0.25Ω. The current is again regulated at 22.2 A, and the output voltage is Vout=5.55 V. Compared to the simulation of FIG. 15, the power Pout is half, so the converter is running at a higher frequency. This results in the correction signal pulses C appearing much more frequently compared to the pulses C of FIG. 15. The control voltage $V_c$ is consequently lower (≈0.65 V) than in the simulation of FIG. 15, and the control current $I_c=(Vref-V_c)/R_1$ is correspondingly larger, thus driving a higher switching frequency.

FIG. 17 shows the output characteristic and relative regulation error of several simulations having different resistance values. The error is low and has minimal changes with varying levels of output voltage Vout.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device comprising:
   a comparator configured to receive a reference signal and a measured value signal representative of an output electrical quantity of a power stage of a switching converter, the comparator being configured to produce a digital detection signal based on a comparison of the measured value signal and the reference signal;
   a control actuator configured to produce correction signal pulses by correcting the digital detection signal;
   an averaging circuit configured to produce a control signal by averaging the correction signal pulses; and
   a power stage driver configured to drive the power stage of the switching converter based on the control signal to regulate the output electrical quantity.

2. The device of claim 1, wherein the control actuator includes a monostable oscillator configured to produce the correction signal pulses.

3. The device of claim 2, wherein the control actuator further includes a counter coupled to the monostable oscillator and configured to reduce a frequency of the correction signal pulses.

4. The device of claim 2, wherein the control actuator further includes a logic gate configured to receive the digital detection signal and a clock signal, and to produce a logic pulse signal that is supplied to clock the monostable oscillator.

5. The device of claim 1, wherein the control actuator further includes:
   a clock configured to produce a clock signal;
   a set-reset flip-flop having a set input configured to receive the digital detection signal and a reset input configured to receive the clock signal.

6. The device of claim 5, wherein the control actuator further includes a counter configured to reduce a frequency of the correction signal pulses.

7. The device of claim 5, wherein the control actuator further includes:
   a time delay circuit coupled between the clock and the reset input of the flip-flop and configured to delay the clock signal;
   a logic gate configured to receive the clock signal and an output of the flip-flop, and to produce a logic signal to a monostable oscillator, the monostable oscillator being configured to produce the correction signal based on the logic signal.

8. The device of claim 1, wherein the control actuator includes:
   an oscillator configured to produce the correction signal pulses based on the digital detection signal.

9. The device of claim 1, wherein the measured value signal is representative of an output voltage of the switching converter.

10. The device of claim 1, wherein the averaging circuit further comprises:
    a first resistor coupled to a reference voltage terminal;
    a second resistor coupled to the first resistor; and
    a capacitor coupled to the first resistor and configured to discharge based on the correction signal.

11. A method, comprising:
    comparing a measured value signal representative of a an output electrical quantity of a power stage of a switching converter to a reference value;
    producing a digital detection signal based on the comparison of the measured value signal and the reference value;
    performing a corrective action at a control actuator when the measured value signal has a value greater than the reference value, performing the corrective action including:
        receiving the digital detection signal at an input of the control actuator;
        producing a sequence of correction signal pulses by correcting the digital detection signal;

averaging the sequence of correction signal pulses to produce a control voltage signal; and driving the power stage of the switching convert based on the control voltage signal to regulate the output voltage.

12. The method of claim 11, performing the corrective action further including:

receiving the digital detection signal and a clock signal at a logic gate;

receiving an output signal of the logic gate at a monostable oscillator;

producing the sequence of correction signal pulses from the monostable oscillator based on the output signal of the logic gate.

13. The method of claim 11, performing the corrective action further including:

receiving the digital detection signal at a set input of a set-reset flip-flop;

receiving a clock signal at a reset input of the set-reset flip-flop;

producing the sequence of correction signal pulses from the set-reset flip-flop based on the digital detection signal and the clock signal.

14. The method of claim 11, performing the corrective action further including:

receiving the digital detection signal at a monostable oscillator;

producing the sequence of correction signal pulses from the monostable oscillator.

15. The method of claim 11, performing the corrective action further including:

receiving the digital detection signal at a set input of a set-reset flip-flop;

producing a clock signal;

delaying the clock signal;

receiving the delayed clock signal at a reset input of the set-reset flip-flop;

producing an output signal from the set-reset flip-flop;

receiving the clock signal and the output signal of the set-reset flip-flop at a logic gate;

receiving an output signal of the logic gate at a monostable oscillator;

producing the sequence of correction signal pulses from the monostable oscillator based on the output signal of the logic gate.

16. A switching converter, comprising:

a power stage, including:

a transformer coupled to an input voltage and configured to produce an output electrical quantity;

a first switch coupled to the transformer;

a sensing circuit configured to produce a measured value signal representative of the output voltage of the transformer;

a signal conditioning circuit, including:

a comparator configured to receive a reference signal and the measured value signal, and to produce a digital detection signal based on a comparison of the measured value signal and the reference signal;

a control actuator configured to produce a series of correction signal pulses by correcting the digital detection signal;

an averaging circuit configured to produce a control voltage signal by averaging the series of correction signal pulses over time;

a modulator coupled to the signal conditioning circuit and configured to produce a pulsed signal based on the control voltage signal; and a driver coupled to the modulator and configured to provide a driving signal to the first switch of the power stage based on the pulsed signal to regulate the output voltage of the transformer.

17. The switching converter of claim 16, wherein the control actuator includes an oscillator configured to produce the series of correction signal pulses.

18. The switching converter of claim 17, wherein the control actuator further includes a logic gate configured to receive the digital detection signal and a clock signal, and to provide a logic signal to the oscillator.

19. The switching converter of claim 16, wherein the control actuator includes:

a clock configured to produce a clock signal; and a set-reset flip-flop having a set input configured to receive the digital detection signal and a reset input configured to receive the clock signal, the flip-flop being configured to produce the series of correction signal pulses.

20. The switching converter of claim 16, wherein the power stage further comprises a second switch coupled to the transformer.

* * * * *